(12) United States Patent
Doidge (10) Patent No.: US 11,375,048 B2
(45) Date of Patent: Jun. 28, 2022

(54) COMPENSATING FOR INTERRUPTIONS IN A WIRELESS CONNECTION

(71) Applicant: DisplayLink (UK) Limited, Cambridge (GB)

(72) Inventor: Ian Christopher Doidge, Papworth-Everard (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 155 days.

(21) Appl. No.: 16/758,940

(22) PCT Filed: Oct. 15, 2018

(86) PCT No.: PCT/GB2018/052960
§ 371 (c)(1),
(2) Date: Apr. 24, 2020

(87) PCT Pub. No.: WO2019/081886
PCT Pub. Date: May 2, 2019

(65) Prior Publication Data
US 2021/0185151 A1 Jun. 17, 2021

(30) Foreign Application Priority Data
Oct. 27, 2017 (GB) .................................. 1717745

(51) Int. Cl.
*H04L 69/04* (2022.01)
*G06T 9/00* (2006.01)
(Continued)

(52) U.S. Cl.
CPC ................ *H04L 69/04* (2013.01); *G06T 9/00* (2013.01); *H04B 7/0617* (2013.01); *H04H 20/71* (2013.01)

(58) Field of Classification Search
CPC ..... H04L 69/04; H04L 67/2828; H04L 69/22; G06T 9/00; H04B 7/0617; H04H 20/71; H03M 7/30; H04W 28/06
See application file for complete search history.

(56) References Cited

U.S. PATENT DOCUMENTS

| 6,292,834 B1 | 9/2001 | Ravi et al. |
| 6,697,642 B1 | 2/2004 | Thomas |

(Continued)

FOREIGN PATENT DOCUMENTS

| WO | 2007051156 | 5/2007 |
| WO | 2007051156 A1 | 5/2007 |
| WO | 2010052570 A1 | 5/2010 |

OTHER PUBLICATIONS

Search Report for International Application No. GB1717745.2, dated Mar. 23, 2018 (1 page).

(Continued)

*Primary Examiner* — Ian N Moore
*Assistant Examiner* — Latresa A McCallum
(74) *Attorney, Agent, or Firm* — Paradice & Li LLP (57) ABSTRACT

A method of compensating for potential interruptions in a wireless spatially selective connection over which data at a first compression level is transmitted from a host device to a client device involves determining (S32) that an interruption to the wireless spatially selective connection over which data is being transmitted at a first compression level to a client device is starting or is due to start, compressing (S3Y3) the data at a second compression level that is higher than the first compression level, and forwarding (S34) the data compressed at the second compression level to a transmitting component for wireless spatially non-selective broadcast while the interruption to the spatially selective connection occurs. Determining that the interruption is due to start may involve analysing a historical record of previous (Continued)

interruptions to determine a periodicity of the previous interruptions or receiving information from the transmitting component that an interruption is expected to occur. Determining that the interruption is starting may involve determining that a buffer used for storing the data prior to transmittal is full, indicative that an interruption has commenced, or receiving information from the transmitting component that an interruption has commenced.

17 Claims, 6 Drawing Sheets (51) Int. Cl.
*H04B 7/06* (2006.01)
*H04H 20/71* (2008.01)

(56) References Cited

U.S. PATENT DOCUMENTS

| | | | |
|---|---|---|---|
| 6,968,387 B2 | 11/2005 | Lanphear | |
| 7,002,973 B2 * | 2/2006 | MeLampy | H04L 29/06027 370/392 |
| 7,423,990 B2 | 9/2008 | Kelton et al. | |
| 9,203,886 B2 | 12/2015 | Balachandran et al. | |
| 9,854,533 B2 | 12/2017 | Cho et al. | |
| 10,693,575 B2 | 6/2020 | Jana et al. | |
| 2003/0198184 A1 | 10/2003 | Huang et al. | |
| 2005/0149835 A1 | 7/2005 | Dacosta | |
| 2005/0210515 A1 | 9/2005 | Roh et al. | |
| 2007/0097257 A1 * | 5/2007 | El-Maleh | H04N 21/23406 348/419.1 |
| 2008/0170630 A1 | 7/2008 | Falik et al. | |
| 2008/0191816 A1 | 8/2008 | Balachandran et al. | |
| 2009/0254657 A1 | 10/2009 | Melnyk et al. | |
| 2009/0276541 A1 | 11/2009 | Lock et al. | |
| 2010/0121977 A1 | 5/2010 | Kontola et al. | |
| 2012/0195356 A1 | 8/2012 | Yi et al. | |
| 2012/0271920 A1 | 10/2012 | Isaksson | |
| 2013/0301430 A1 | 11/2013 | Pamu et al. | |
| 2014/0204902 A1 | 7/2014 | Maltsev et al. | |
| 2015/0071075 A1 | 3/2015 | Ramakrishnan | |
| 2016/0198068 A1 * | 7/2016 | Makar | H04N 21/4122 348/518 |
| 2017/0280460 A1 | 9/2017 | Emmanuel et al. | |
| 2018/0091765 A1 * | 3/2018 | Mobasher | H04L 47/32 |

OTHER PUBLICATIONS

International Search Report for PCT/GB2018/052960, dated Jan. 17, 2019, (3 pages).
International Search Report issued in International Application No. PCT/GB2018/052833 dated Dec. 5, 2018, 3 pages.
UK Intellectual Property Office Search Report issued in UK Application No. GB1716519.2 dated Mar. 26, 2018, 3 pages.

* cited by examiner

Figure 6

COMPENSATING FOR INTERRUPTIONS IN A WIRELESS CONNECTION

CROSS REFERENCE TO RELATED APPLICATIONS

This application claims the benefit of PCT/GB2018/052960 filed Oct. 15, 2018, having a priority claim to Great Britain Patent Application No. 1717745.2 filed Oct. 27, 2017. The contents of these prior patent documents are incorporated herein by reference.

BACKGROUND

Virtual reality is becoming an increasingly popular display method, especially for computer gaming but also in other applications. This introduces new problems in the generation and display of image data as virtual reality devices must have extremely fast and high-resolution displays to create an illusion of reality. This means that a very large volume of data must be transmitted to the device from any connected host. Hitherto, this has meant that long cables are required between a host computing device and a wearable headset having the high-resolution displays for a user.

As virtual-reality devices become more popular, it will become desirable for the wearable headsets to be wirelessly connected to their hosts. This introduces considerable problems with the transmission of the large volume of display data required, as wireless connections commonly have very limited bandwidth. However, wireless signals require maintenance that is not required by a wired connection, especially to account for movement of either a host computing device (i.e. the generating and transmitting device) or client device (i.e. the receiving and outputting device). An example of such maintenance is beamforming, by which the host device adjusts a directional wireless signal in order to account for relative movement of the client device. This results in interruption of data transmission over the wireless connection while such adjustment is in progress.

Such interruptions are especially problematic when a stream of data is being transmitted and interruptions will be noticeable to a user, for example in the cases of video or audio data. In these cases an interruption may result in loss of data which will appear to the user as a 'skip' or 'judder'.

The methods of the invention seek to mitigate this problem.

SUMMARY

According to a first aspect, the invention provides a method of compensating for potential interruptions in a wireless spatially selective connection over which data at a first compression level is transmitted from a host device to a client device, the method comprising:

determining that an interruption to the wireless spatially selective connection over which data is being transmitted at a first compression level to a client device is starting or is due to start;

compressing the data at a second compression level that is higher than the first compression level; and forwarding the data compressed at the second compression level to a transmitting component for wireless spatially non-selective broadcast while the interruption to the spatially selective connection occurs.

In one embodiment, determining that the interruption is due to start comprises analysing a historical record of previous interruptions to determine a periodicity of the previous interruptions and using the determined periodicity to calculate when a next interruption may be expected. Preferably, a duration of the potential interruption is calculated based on the determined periodicity and the compressing the data at the second compression level and forwarding the data compressed at the second level for the wireless spatially non-selective broadcast is performed at least for the calculated duration of the interruption.

Determining that the interruption is starting may be determined by determining that a buffer used for storing the data prior to transmittal is full, indicative that an interruption has commenced. Preferably, the method further comprises determining an end of the interruption by determining that the buffer is able to accept data at a rate higher than a predetermined threshold rate and the compressing the data at the second compression level and forwarding the data compressed at the second level for the wireless spatially non-selective broadcast is performed at least until the end of the interruption.

Determining that the interruption is due to start may comprise receiving information from the transmitting component that an interruption is expected to occur. Preferably, a duration of the potential interruption is determined by receipt of information from the transmitting component of an expected duration of the potential interruption and the compressing the data at the second compression level and forwarding the data compressed at the second level for the wireless spatially non-selective broadcast is performed at least for the duration of the interruption.

Determining that the interruption is starting may comprise receiving information from the transmitting component that an interruption has commenced. Preferably, an end of the interruption is determined by receipt of information from the transmitting component that the interruption has ended and the compressing the data at the second compression level and forwarding the data compressed at the second level for the wireless spatially non-selective broadcast is performed at least until the end of the interruption.

The interruption may occur for a predetermined duration and the compressing the data at the second compression level and forwarding the data compressed at the second level for the wireless spatially non-selective broadcast is performed at least until an expected end of the interruption.

The method preferably further comprises transmitting the data at the first compression level over the wireless spatially selective connection to the client device when it is determined that the interruption has finished.

Preferably, the data comprises display data, which may be compressed at the second compression level at least until an end of a frame of the display data that is being compressed at the second compression level.

In some cases, the first compression level comprises a zero compression level, with no compression at all.

In a preferred embodiment, the method further comprises:

performing one or more maintenance operations that cause the interruption; and setting the first compression level for compressing the data when the maintenance operation is completed.

Preferably, the one or more maintenance operations comprises any one or more of:

beamforming;

transmission/reception channel changing;

entering a power-reduced mode of operation;

entering a sleep mode of operation.

The wireless spatially selective connection is preferably transmitted in the 60 GHz wavelength band, which may comply with the IEEE 802.11ad standard. The wireless spatially selective connection may be a line-of-sight connection, which may be an optical connection.

The wireless spatially non-selective broadcast is preferably in a 2.4 or 5 GHz wavelength band, which may comply with the IEEE 802.11ac standard.

According to a second aspect, the invention provides a device configured to perform all steps of the method described above.

According to a third aspect, the invention provides a computer readable medium including executable instructions which, when executed in a processing system, cause the processing system to perform all steps of the method described above.

In one embodiment, there is provided a method of compressing streamed data for transmission, comprising Generating a unit of streamed data on a host device;

The host device determining whether an interruption is likely;

If not, the host device compressing the data with a normal level of compression and transmitting it over a line of sight wireless connection;

If so, the host device compressing the data with a higher level of compression and broadcasting it wirelessly in a spatially non-discriminatory manner.

The normal level of compression may be no compression. Preferably, the higher level of compression is determined from the bandwidth available for wireless broadcast.

This method improves the chance that the data will be transmitted despite the interruption, rather than being lost as occurs in conventional systems. The application of a higher level of compression may mean that quality is reduced, but a brief period of low quality will be less disruptive to a user than a break in the stream and outright loss of data.

BRIEF DESCRIPTION OF THE DRAWINGS

Embodiments of the invention will now be more fully described, by way of example, with reference to the drawings, of which.

DETAILED DESCRIPTION OF THE DRAWINGS

Figure 1:
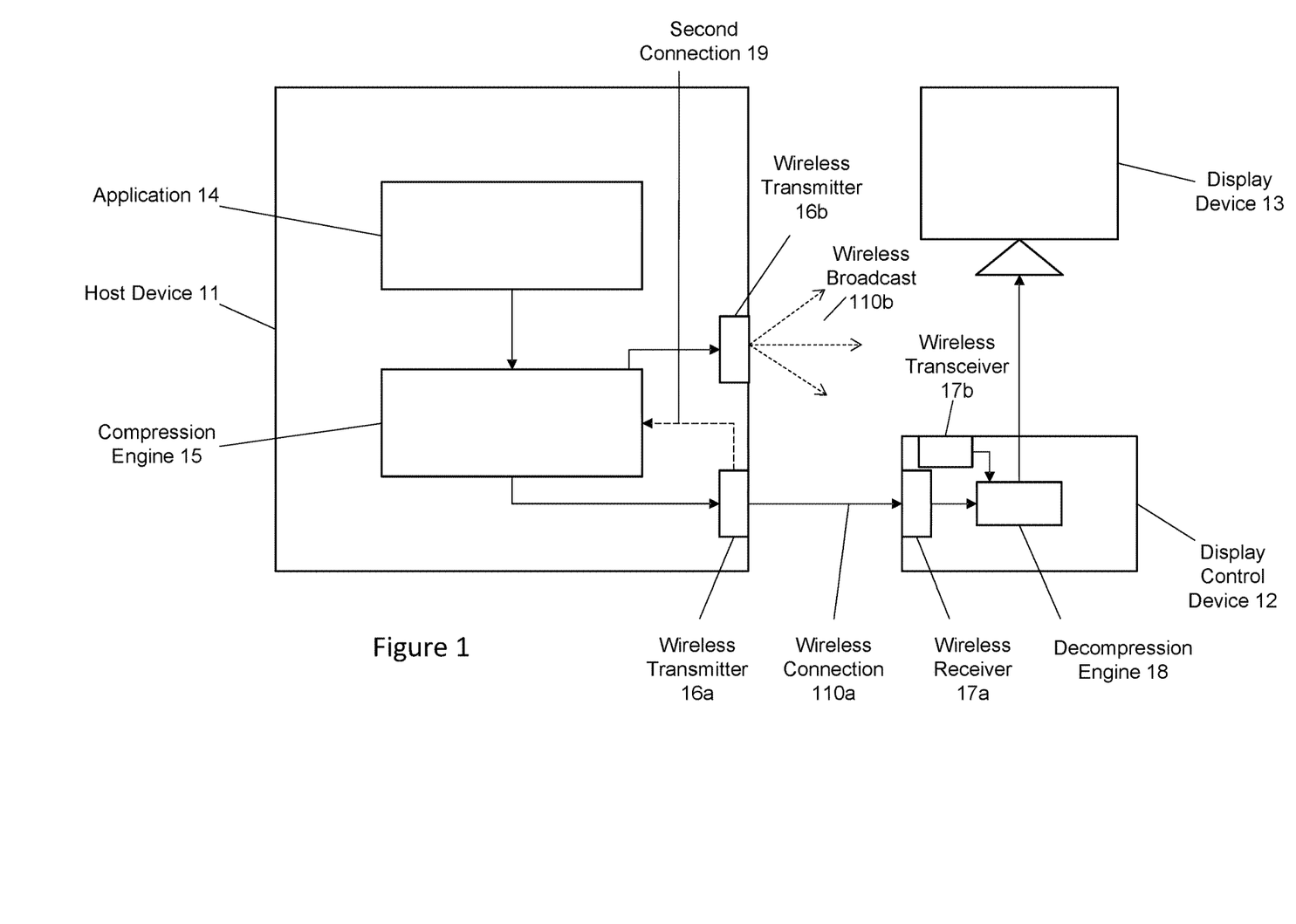
FIG. 1 shows a block diagram of an example system that can be used in an embodiment of the invention.

FIG. 1 shows an example display system comprising a host computing device [11], a display control device [12], and a display device [13]. The host device [11] includes, among other components, an application [14], for example running on a graphics processing unit, which generates display data and a compression engine [15] which applies compression algorithms to reduce the volume of data prior to transmission. The application [14] is connected to the compression engine [15] in order to pass generated display data to it.

The compression engine [15] is in turn connected to a wireless transmitter [16a] of the host device [11]. This maintains a wireless connection [110a] over a wireless spatially selective connection to a corresponding wireless receiver [17a] on the display control device [12] and uses the connection [110a] to transmit the compressed display data to the display control device [12]. The wireless spatially selective connection may, for example, be a wireless line-of-sight connection, which may in the millimetre wavelength spectrum (10-100 GHz), such as in the 60 GHz wavelength band, or may be another suitable radio wavelength band or may be an optical connection, whether using visible or non-visible light. Such a wireless spatially selective connection may be a connection complying with IEEE standards known as 802.11ad or 802.11aj or 802.11ay, which uses frequencies in the millimetre range. The IEEE 802.11ad microwave Wi-Fi connection has a range that is measured in a few metres so that it can be used for very short range (across a room) high volume data transfers such as HD video transfers. The scheme is sometimes known by the name WiGig after the Wireless Gigabit Alliance that endorses it.

The display control device [12] may be a docking station, set-top box or similar separate display controller, or alternatively it may be co-located with the display device [13]—i.e. sharing the same casing—for example as part of a head-mounted display such as a virtual-reality headset. It includes the aforementioned wireless receiver [17a], connected to a decompression engine [18] which applies algorithms to the received compressed display data in order to re-create at least an approximation of the original data and transmits the decompressed display data to the display device [13] for display.

There may also be other components included in the display control device [12], such as memory and engines for converting the display data from a general-purpose format to a display-specific format, but these are known and are not shown here.

In a conventional system, the compression engine [15] and the wireless transmitter [16a] in the host device [11] may only be connected by a single connection which carries data. However, in embodiments of the invention a second connection [19] may also be used to carry signals from the wireless transmitter [17a] to the compression engine [15] indicating, for example, the level of bandwidth immediately available in the connection [110a] or that an interruption is to take place. This connection [19] is shown in FIG. 1 by a dashed line from the wireless transmitter [16a] to the compression engine [15].

Figure 2:
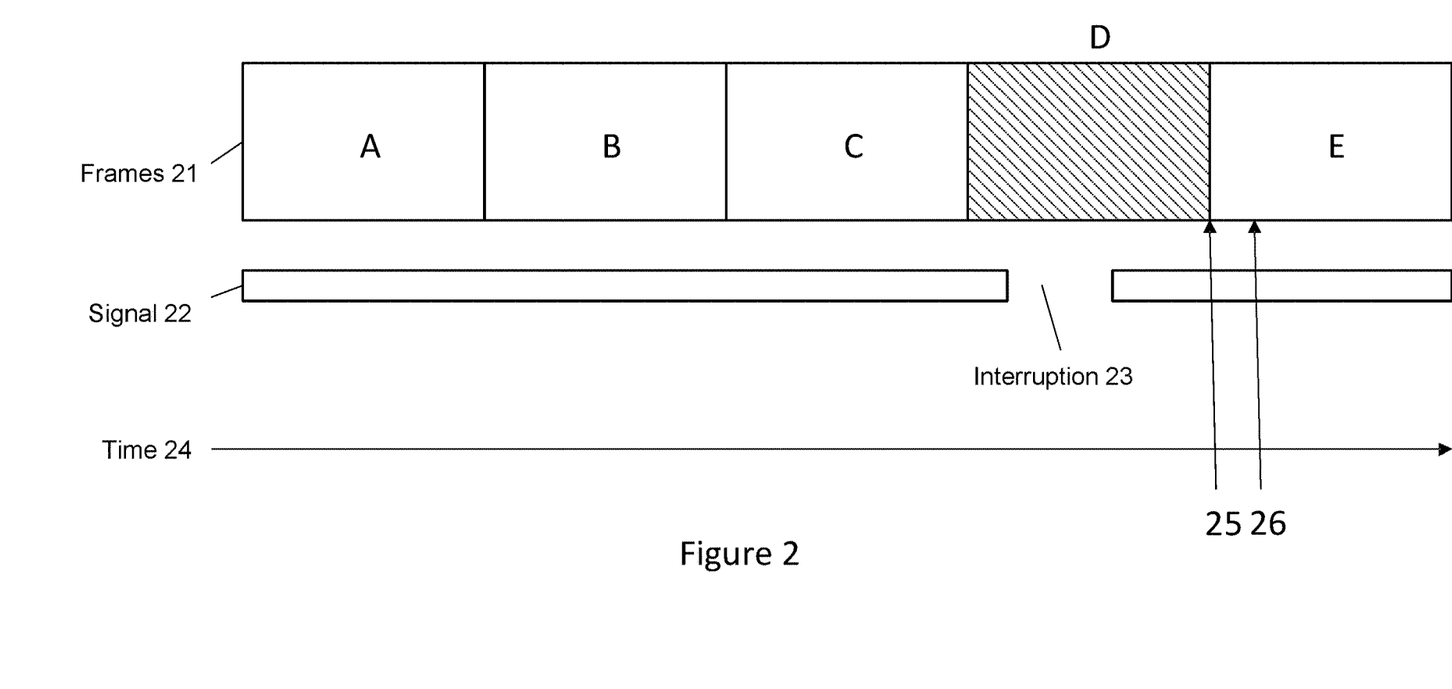
FIG. 2 shows a stream of display data being interrupted in a conventional system.

FIG. 2 shows a stream of data sent over the wireless connection [110a]. In the upper part of the Figure, frames [21] of display data are represented by individual boxes [21A, B, C, D, E]. The length of each box [21A, B, C, D, E] from left to right indicates the length of time taken for its transmission, and the height of each box [21A, B, C, D, E] indicates the level of compression used compared to the level of compression used in transmission of the other frames [21A, B, C, D, E], such that a smaller height indicates greater compression. In the lower part of the Figure, the signal carried on the wireless connection [110a] is represented by an interrupted strip [22]. The interruption [23] represents an interruption in the wireless connection [110a] and/or signal [22], for example due to the wireless transmitter [16] and the wireless receiver [17] having moved relative to each other and a beamforming operation being required to accurately align them again. Finally, an arrow [24] from the left side of the Figure to the right side represents the passage of time.

The white frames [21A, B, C, E] represent frames of display data that are transmitted normally as the wireless connection [110a] is not interrupted during transmission. They can then be displayed normally on the display device [13] and will present a smooth image. However, the interruption [23] occurs during the transmission of one frame [21D]—indicated with diagonal hatching—and this frame [21D] may therefore be lost during transmission if the interruption is total. Conventionally, under these circumstances, the previous frame [21C] will be repeatedly shown on the display until a new frame arrives, and this will result in the image 'sticking', disrupting the smooth image. If, as may sometimes be the case, the host device [11] is still able to transmit some data over the wireless connection [110a], the frame [21D] may still be transmitted but it will be delayed and transmission will not be complete until the time indicated by arrow [26], for example. However, if it is required for display at the time indicated by arrow [25], it will therefore be only partially displayed, leading to the presence of visual artefacts such as tearing in the displayed image. Both cases will be especially noticeable in applications such as virtual reality, in which a detailed moving image is presented and the movement must be both prompt and accurate to avoid causing discomfort to the user.

Interruptions [23] caused by operations of the wireless transmitter [16a] and wireless receiver [17a], such as beamforming, can be predictable and their timing and length can be extracted from a driver or a wireless controller, if such a secondary connection [19] exists.

Alternatively or additionally, the timings of interruptions may be determined from the history of the wireless connection and transmission characteristics of the link [110]. There are a number of techniques for spectral analysis that are good candidates for identifying such patterns, including those of differing periodicity that may result from multiple overlapping interruptions, and for filtering out noise in the bandwidth caused by, for example, movement of the display control device [12] or host device [11]. Techniques such as fourier or periodicity transforms are two such techniques.

Figure 3:
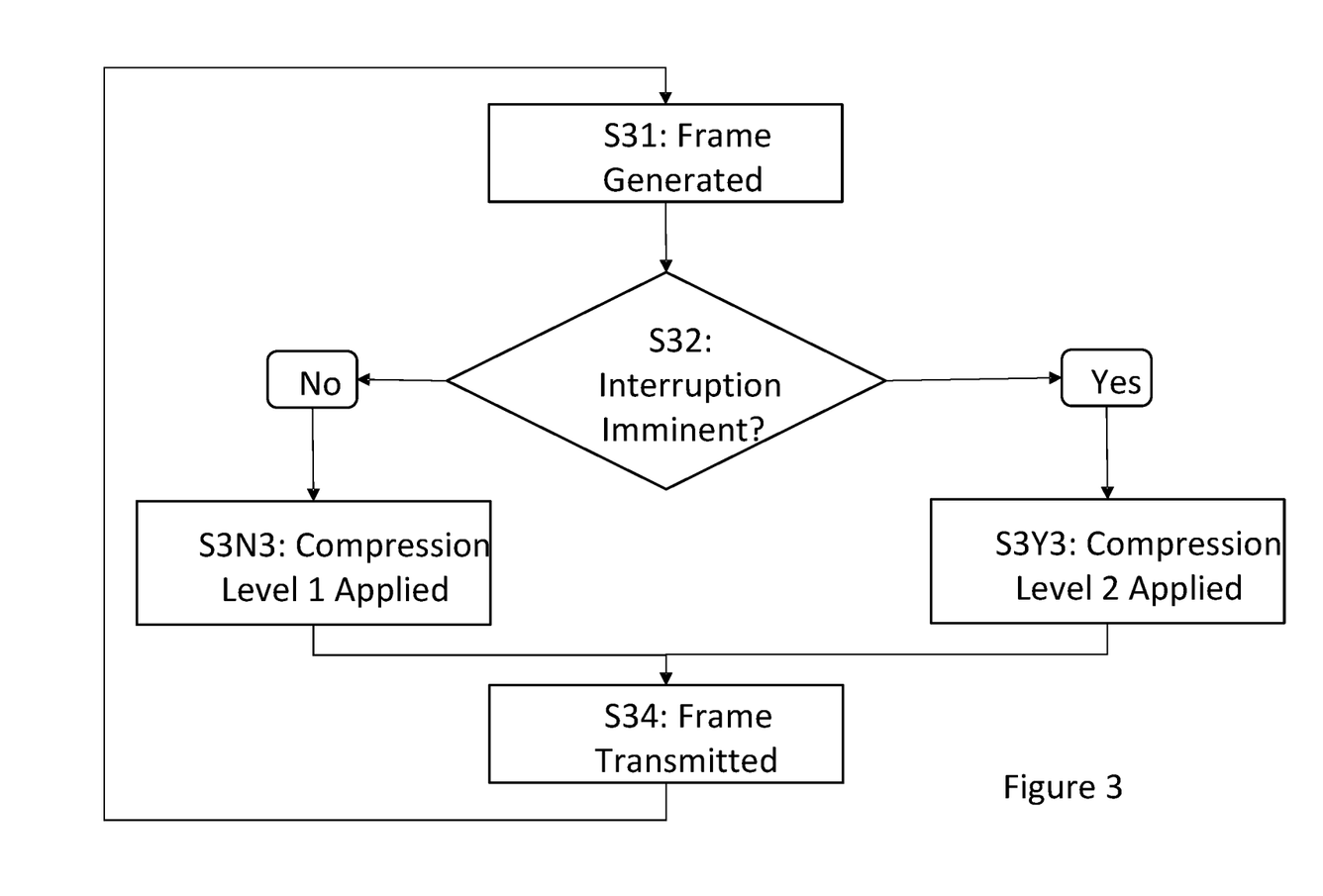
FIG. 3 shows a flow chart of a method according to an embodiment of the invention.
Figure 4:
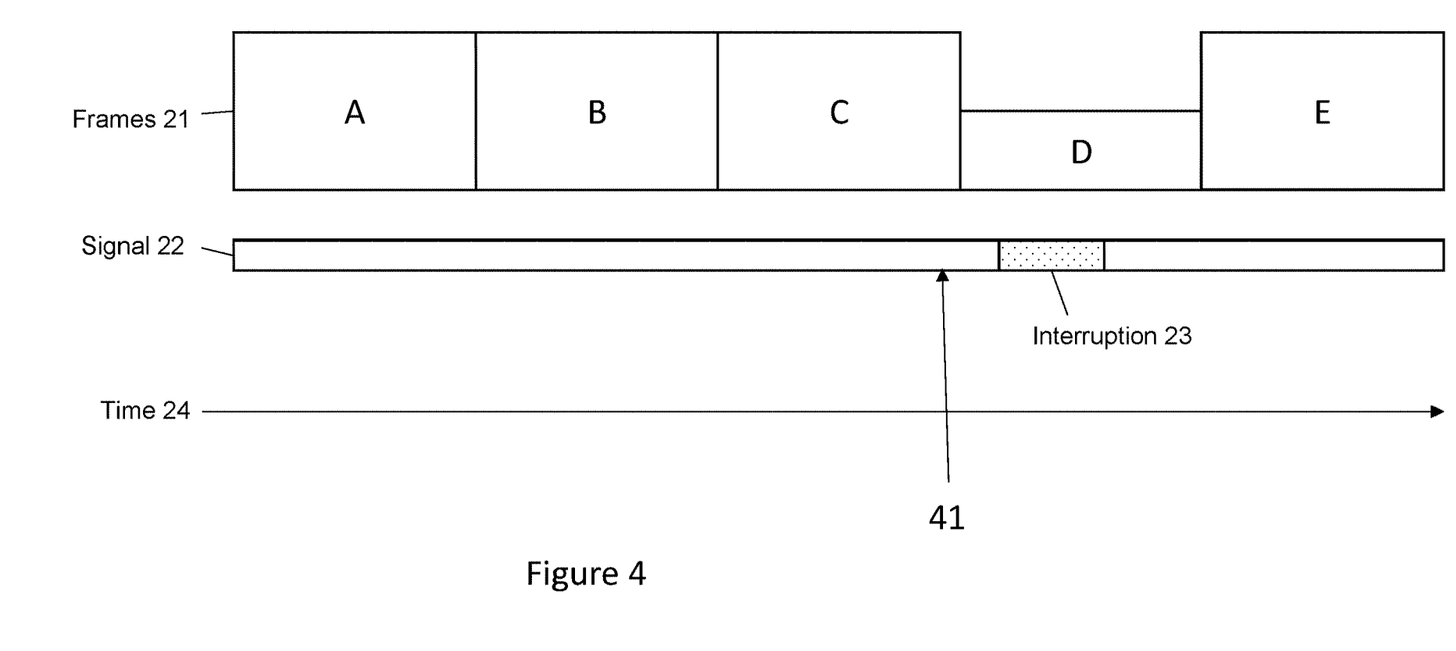
FIG. 4 shows a stream of display data being interrupted in a system according to an embodiment of the invention with a signal from a wireless transmitter.
Figure 5:
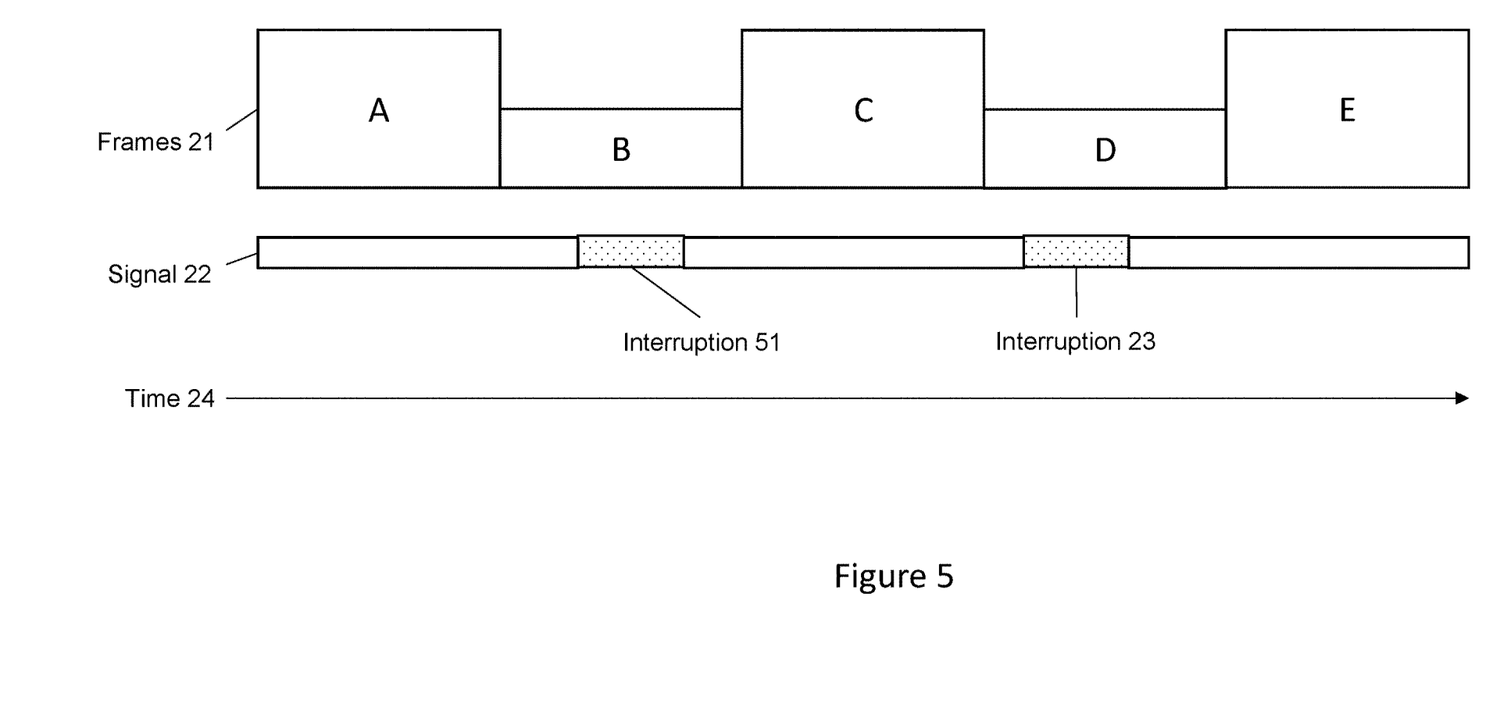
FIG. 5 shows a stream of display data being interrupted periodically in a system according to another embodiment of the invention.
Figure 6:
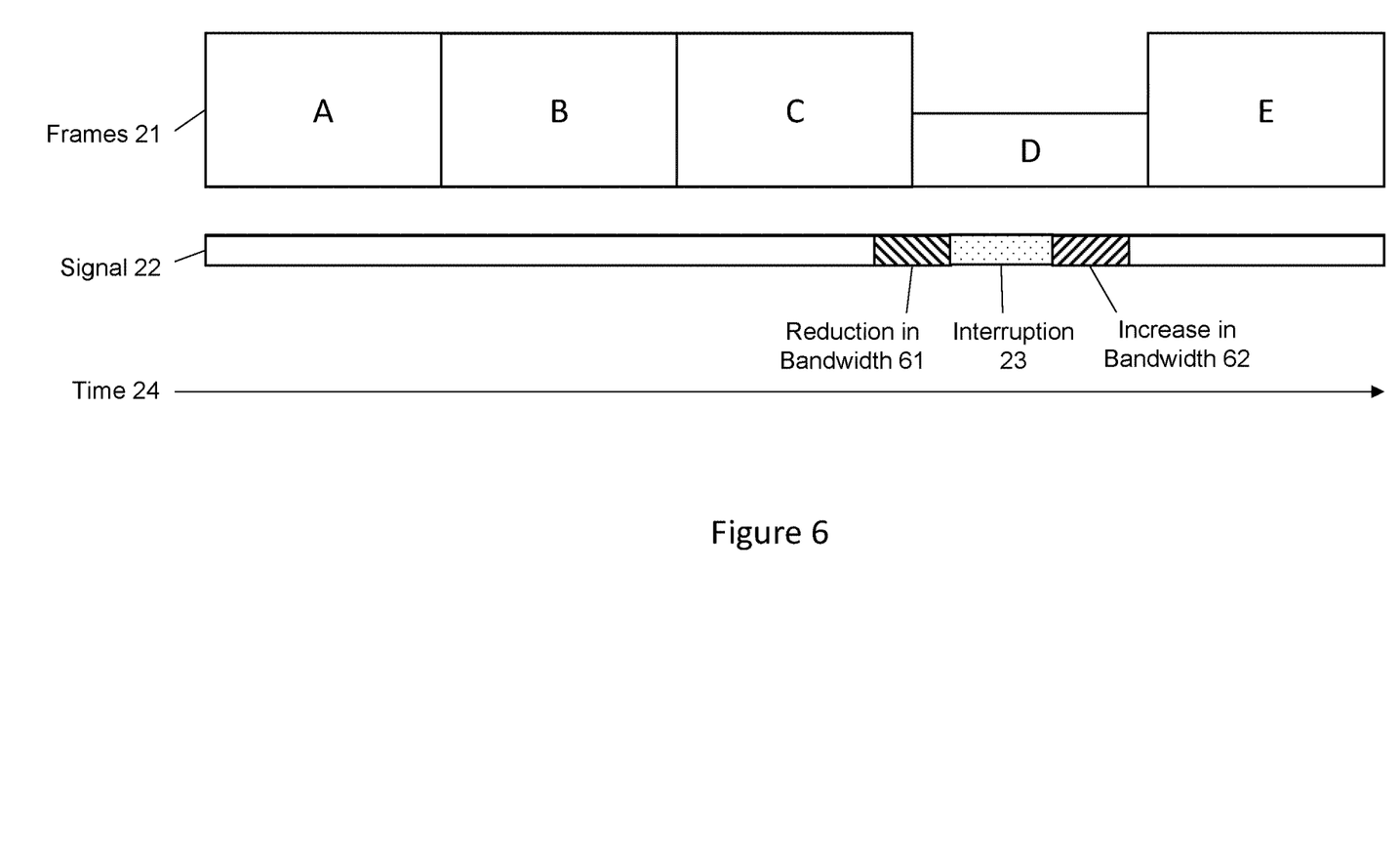
FIG. 6 shows an interruption being detected as it commences in another embodiment of the invention.

FIG. 3 shows a generic process by which such information can be used, which will be iterated for each of the examples shown in FIGS. 4-6. Throughout FIGS. 4-6, a similar notation is used to that described with reference to FIG. 2: the wireless connection [110a] is represented by a narrow strip [22] in the lower part of the Figure, interrupted [23] as previously described. The frames [21] produced and transmitted by the host device [11] are also shown as white boxes as in FIG. 2 sized according to the compression level used in their transmission and the length of time required to transmit them as previously described. The passage of time [24] is indicated by an arrow passing from left to right at the bottom of each Figure.

In this embodiment illustrated in FIG. 3, at Step S31, the application [14] running on the GPU of the host device [11] generates a frame of display data [21] in the conventional way. It then transmits it to the compression engine [15]. Meanwhile, the wireless transmitter [16a] determines whether it would be appropriate to interrupt the connection [110a]. For example, it might determine that the signal strength has dropped due to movement of the display control device [12] relative to the host device [11]. Alternatively, it might determine that the temperature of the transmitter [16a] has risen and it is necessary to briefly turn off the transmitter [16] for cooling, or it might receive a signal from the wireless receiver [17a] on the display control device [12] requesting an interruption in the connection [110], perhaps for similar reasons.

At Step S32 the compression engine [15] determines whether an interruption is due or has commenced. Examples of methods by which it makes this determination and of its resulting behaviour at Steps S3N3 and S3Y3 are described with reference to FIGS. 4-6.

FIG. 4 shows the results of an example system in which the wireless transmitter [16a] sends a signal [19] to the compression engine [15] indicating that it will soon interrupt the connection [110a]. The wireless transmitter [16a] may send a periodic signal [19] to the compression engine [15] regardless of the determination of whether it will interrupt the connection [110a] but indicating whether it will or won't interrupt the connection. Alternatively, it may only send a signal [19] when it has determined that an interruption [23] is required. Upon receipt of a signal [19] indicating that the connection [110a] is to be interrupted, a flag may be set in the compression engine [15] to indicate whether an interruption [23] is required and due, or the signal [19] may simply serve to instruct the compression engine [15] to apply higher compression to the next frame without any storage of a signal.

If there is a flag, it may be a simple Boolean indication of whether there will be an interruption within a predetermined time period, for example an estimate of the time it will take to transmit a frame, which may then be cleared once that time period has passed. Alternatively, there may also be an indication of how long it will be until the interruption begins, and the compression engine [15] may then take this forecast into account when determining when to apply a higher level of compression to received frames, and for how long.

At Step S32 (of FIG. 3) the compression engine [15] determines whether an interruption is due. This may be by checking a flag as aforementioned, or according to the receipt of a signal [19] from the radio transmitter [16a] or lack of one. The normal case is that an interruption [23] is not required, and in this case the process follows the branch beginning at "No" to Step S3N3. At this step, the compression engine [15] compresses the received frame to a first compression level. This is the standard compression level used by the system, and may in fact mean that the frame is not compressed at all but is transmitted unchanged. This is the compression level used for frames [21A, B, C, E] as indicated by the fact that they are all the same height in the Figure.

At time point [41] in FIG. 4 the wireless transmitter [16a] indicates to the compression engine [15] as aforementioned that an interruption is due. In the example shown in FIG. 4 the signal [19] from the wireless transmitter [16a] indicates that no data transmission will be possible. As a result, at Step S32 the compression engine [15] determines that an interruption is due and the process follows the branch beginning at "Yes" to Step S3Y3. At this step, the compression engine [15] compresses the received frame to a second compression level. In the example shown in FIG. 4 this second compression level is higher than the first compression level, as indicated by the fact that frame [21D] is smaller than the other frames [21A, B, C, E]. This indicates that it is compressed to a higher degree. This may mean compressing the data where this would not normally occur, or it may mean applying a compression algorithm that will reduce the volume of the data to a greater degree than the standard compression, perhaps at the risk of losing detail and quality in the final image.

Because of the high level of compression used on the frame [21D] it can be transmitted over a lower bandwidth than that used for wireless connection [110a]. This is also indicated by the small size of the frame [21D] in FIG. 4. When this occurs, the compression engine [15] then sends the more highly compressed frame [21D] to a second wireless transmitter [16b], which broadcasts the more highly compressed frame [21D] wirelessly [110b]. The wireless broadcast [110b] would be spatially non-selective, so it would be multi-directional and may, for example, be in the 2.4 or 5 GHz wavelength bands. Such a wireless broadcast may comply with IEEE standards known as 802.11ac or 802.11ax.

As shown in FIG. 4 the broadcast [110b] from the wireless transmitter [16b] is received by a wireless transceiver [17b] in the client device, and passed to the decompression engine [18]. Thereafter, the frame [21D] is processed in the same way as if it had arrived from wireless receiver [17a] but, of course, it will have a higher level of compression, so the de-compression engine [18] will need to know that it had been more highly compressed and will need to apply an appropriate decompression algorithm to the received compressed display data in order to re-create at least an approximation of the original data and transmit the decompressed display data to the display device [13] for display.

FIG. 5 shows an example in which interruptions [51, 23] are periodic and therefore can be predicted using a historical analysis of the connection [110a/22]. This may be performed by the compression engine [15], which can then use the resulting knowledge of the normal periodicity of the interruptions [51, 23] to determine the time interval before the next interruption will occur.

At Step S32, the compression engine [15] determines the time that has passed since the last interruption [51] using, for example, an internal timer that is reset to zero every time an interruption occurs. It then determines whether it should expect another interruption soon by comparing the value of the timer to the period of the interruptions as determined by analysis of the historical behaviour of the connection [110a/22]. For example, if previous interruptions have occurred every 5 ms and the value of the timer is only 2 ms, the compression engine [15] determines that no interruption is due and the process follows the branch beginning at "No" to Step S3N3 at which the compression engine [15] applies a first level of compression to the frame [21A, C, E].

If the value of the timer is 5 ms or within a predetermined threshold of proximity to 5 ms—for example the period of interruptions is determined to be 5 ms, the compression engine [15] applies a threshold of 4.5 ms to allow some additional time, and at Step S32 the timer has a value of 4.7 ms—the compression engine [15] determines that it should expect another interruption [23] soon. The process then follows the branch beginning at "Yes" to Step S3Y3 and the compression engine [15] applies the second level of compression to the frame [21D] as previously described, and forwards it to the second wireless transmitter [16b] for wireless broadcast [110b] to be received by the wireless receiver [17b].

FIG. 6 shows an example involving a non-periodic interruption [23] in the signal [22]. This example may also involve a signal [19] from the wireless transmitter [16a] to the compression engine [15] if analysis of the bandwidth of the connection [110a] is carried out by the radio transmitter [16a] and a suitable signalling connection [19] is available. Alternatively, analysis of the bandwidth of the connection [110a] may be carried out by the compression engine [15], in which case the methods used in these examples may serve as a method for the compression engine [15] to determine that a non-periodic interruption [23] is starting without any signalling from the wireless transmitter [16a].

As in the previous Figures, the signal [22] is indicated by a strip at the bottom of FIG. 6, but in this example the interruption [23] is preceded [61] and succeeded [62] by periods of low bandwidth in which the level of the available bandwidth is falling and rising respectively. The reduction in bandwidth [61] can be detected by the wireless transmitter [16a] due to its intrinsic knowledge of the bandwidth available for transmission or by the compression engine [15] as after a period of low bandwidth compressed data that is ready for transmission but could not be transmitted due to lack of bandwidth will "back up" as the flow buffers between or in the compression engine [15] and/or the wireless transmitter [16a] fill. This lack of space in the buffers can serve as an indication to the compression engine [15] that the level of available bandwidth has fallen.

In either case, the compression engine [15] may use the fall in bandwidth as an indication that an interruption is starting. For example, analysis of the history of the connection [110a] may indicate that when the bandwidth falls at a particular rate or below a particular threshold, such behaviour is always followed by an interruption [23]. Accordingly, this knowledge may be used to set a flag indicating that an interruption [23] is starting or it may be used as a signal in itself as previously described.

At Step S32 the compression engine [15] determines whether the bandwidth has fallen in a manner indicating that an interruption [23] is starting, according to predetermined metrics as previously described. If the bandwidth is at a normal level or within an acceptable boundary, the compression engine [15] determines that an interruption [23] has not started and the process follows the branch beginning at "No" to Step S3N3: the compression engine [15] applies the first level of compression to the received frame [21A, B, C, E].

If the compression engine [15] determines at Step S32 that the bandwidth has fallen in a manner that indicates that an interruption [23] is starting, the process follows the branch beginning at "Yes" to Step S3Y3 and the compression engine [15] applies the second level of compression. This results in the frame [21D] having a smaller volume and therefore increasing the likelihood that it can be transmitted over the low bandwidth wireless broadcast [110b].

In the examples shown in FIGS. 4 and 5, where the expected length of the interruption [23] is more likely to be known due to signals [19] from the wireless transmitter [16a] or analysis of previous interruptions [51], the compression engine [15] could return to the first level of compression as soon as the interruption [23] was known to be over or at another known point after the interruption [23], for example at the beginning of transmission of a subsequent frame [21E] after the interruption [23] as is shown in FIGS. 4, 5, and 6, since either the frame that was interrupted [21D] was transmitted successfully or it is too late and the deadline for its display has already passed.

In the examples shown in FIG. 6, however, the length of the interruption [23] is not predictable due to the fact that it is not periodic and signals [19] from the wireless transmitter [16a] may not actually indicate the interruption [23] as opposed to being, for example, regular updates on the current bandwidth. The compression engine [15] therefore determines that the interruption [23] has ended by an increase [62] in available bandwidth as the connection [110a] returns to its normal state. It may determine this either from an update on the available bandwidth from the wireless transmitter [16a] or by monitoring the level of its output buffers to determine when they begin to empty at an acceptable rate. It may then return to the first level of compression as soon as the bandwidth has returned to an acceptable level, indicating that the interruption [23] is over, or at the beginning of the subsequent frame [21E] according to the same behaviour as the compression engine [15] in the examples shown in FIGS. 4 and 5.

Furthermore, such methods are not limited to the case of an interruption [23] detected due to a reduction in bandwidth [61]; they may be used in any other case. For example, in the examples shown in FIG. 4 the compression engine [15] could begin applying the second level of compression [23] is due or starting, and in the example shown in FIG. 5 the compression engine [15] could return to the first level of compression as soon as analysis of the history of the connection [110] indicates that the interruption [23] should be over.

The second level of compression may be determined by the amount of bandwidth available on the wireless broadcast. Furthermore, the client device [12] may provide feedback (not shown) to the host device indicating the amount of data received over the wireless broadcast and therefore the throughput can be determined by the host device to select an appropriate second level of compression, that may be used to make sure that the data sent over the wireless broadcast [110b] is received at the highest appropriate quality level.

These methods are an improvement over the current art because in the examples shown in FIGS. 4-6 none of the frames [21] are dropped. The frame [21D] that would have been dropped is instead compressed to a greater degree than the other frames [21A, B, C, E], and sent over the wireless broadcast. This means that it requires less bandwidth for transmission. It will therefore be displayed on the display device [13] as normal, without visible interruption to the movement of the image, even if the quality of the individual frame [21D] is reduced.

Although particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa, and modules which are described as separate may be combined into single modules and vice versa. Functionality of the components may be embodied in one or more hardware processing device(s) e.g. processors and/or in one or more software modules, or in any appropriate combination of hardware devices and software modules. Furthermore, software instructions to implement the described methods may be provided on a computer readable medium.

The invention claimed is:

1. A method of compensating for potential interruptions in a wireless spatially selective connection over which data at a first compression level is transmitted from a host device to a client device, the method comprising:
   determining that a first interruption to the wireless spatially selective connection over which data is being transmitted at a first compression level to a client device is starting or is due to start based on a periodicity of previous interruptions associated with a historical record of previous interruptions;
   calculating a duration of the first interruption based on the periodicity of the previous interruptions;
   compressing the data at a second compression level that is higher than the first compression level; and
   forwarding the data compressed at the second compression level to a transmitting component, for wireless spatially non-selective broadcast, for at least the duration of the first interruption.

2. The method of claim 1, further comprising:
   determining that a second interruption to the wireless spatially selective connection is starting based on a buffer used for storing the data prior to transmittal being full;
   determining an end of the second interruption based on the buffer being able to accept data at a rate higher than a predetermined threshold rate; and
   forwarding the data compressed at the second level to the transmitting component, for wireless spatially non-selective broadcast, for at least a duration of the second interruption.

3. The method of claim 1, further comprising:
   receiving information from the transmitting component indicating that a second interruption to the wireless spatially selective connection is expected to occur and a duration associated with the second interruption; and
   forwarding the data compressed at the second level to the transmitting component, for wireless spatially non-selective broadcast, for at least the duration associated with the second interruption.

4. The method of claim 1, further comprising:
   receiving first information from the transmitting component indicating that a second interruption to the wireless spatially selective connection has commenced; and
   receiving second information from the transmitting component indicating that the second interruption has ended; and
   forwarding the data compressed at the second level to the transmitting component, for wireless spatially non-selective broadcast, for at least a duration of the second interruption.

5. The method of claim 1, further comprising transmitting the data at the first compression level over the wireless spatially selective connection to the client device at the end of the duration of the first interruption.

6. The method of claim 1, wherein the data comprises display data, wherein the display data is compressed at the second compression level at least until an end of a frame of the display data that is being compressed at the second compression level.

7. The method of claim 1, wherein the first compression level comprises a zero compression level at which no compression is performed on the data.

8. The method of claim 1, further comprising:
   performing one or more maintenance operations that cause the interruption; and
   setting the first compression level for compressing the data when the maintenance operation is completed,
   wherein the one or more maintenance operations include one or more of:
   beamforming;
   transmission or reception channel changing;
   entering a power-reduced mode of operation; or
   entering a sleep mode of operation.

9. The method of claim 1, wherein the wireless spatially selective connection comprises one or more of:
   a connection in a millimetre wavelength spectrum;
   a connection compliant with the Institute of Electrical and Electronics Engineers (IEEE) 802.11ad, the IEEE 802.11aj, or the IEEE 802.11 ay amendment to the IEEE 802.11 standard; and
   a line-of-sight connection.

10. The method of claim 1, wherein the wireless spatially non-selective broadcast comprises one or more of:

a broadcast in a 2.4 or 5 GHz wavelength band; and a broadcast compliant with the IEEE 802.11ac or the IEEE 802.11ax amendment to the IEEE 802.11 standard.

11. A system for compensating for potential interruptions in a wireless spatially selective connection over which data at a first compression level is transmitted to a client device, the system comprising:

a compression engine configured to:

determine that an interruption to the wireless spatially selective connection over which data is being transmitted at a first compression level to the client device is starting or is due to start based on a periodicity of previous interruption associated with a historical record of previous interruptions;

calculate a duration of the interruption based on the periodicity of the previous interruptions;

compress the data at a second compression level that is higher than the first compression level; and     a transmitting component configured to wireless spatially non-selective broadcast the data compressed at the second compression level for at least the duration of the interruption.

12. The system of claim 11, wherein the compression engine is further configured to:

determine that a second interruption to the wireless spatially selective connection is starting based on a buffer used for storing the data prior to transmittal being full;

determine an end of the second interruption based on the buffer being able to accept data at a rate higher than a predetermined threshold rate; and     forward the data compressed at the second level to the transmitting component, for wireless spatially non-selective broadcast, for at least a duration of the second interruption.

13. The system of claim 11, wherein the compression engine is further configured to:

receive information from the transmitting component indicating that a second interruption to the wireless spatially selective connection is expected to occur and a duration associated with the second interruption; and     forward the data compressed at the second level to the transmitting component, for wireless spatially non-selective broadcast, for at least the duration associated with the second interruption.

14. The system of claim 11, wherein the compression engine is further configured to:

receive first information from the transmitting component indicating that a second interruption to the wireless spatially selective connection has commenced; and     receive second information from the transmitting component indicating that the second interruption has ended; and     forward the data compressed at the second level to the transmitting component, for wireless spatially non-selective broadcast, for at least a duration of the second interruption.

15. The system of claim 11, wherein the compression engine is further configured to set the first compression level for compressing the data when one or more maintenance operations are completed, wherein the one or more maintenance operations include one or more of:

beamforming;

transmission or reception channel changing;

entering a power-reduced mode of operation; or entering a sleep mode of operation.

16. The system of claim 11, wherein the wireless spatially selective connection comprises one or more of:

a connection in a millimetre wavelength spectrum;

a connection compliant with the Institute of Electrical and Electronics Engineers (IEEE) 802.11ad, the IEEE 802.11aj, or the IEEE 802.11ay amendment to the IEEE 802.11 standard; and     a line-of-sight connection.

17. A non-transitory computer readable medium including executable instructions which, when executed in a processing system, cause the processing system to:

determine that an interruption to a wireless spatially selective connection over which data is being transmitted at a first compression level to a client device is starting or is due to start based on a periodicity of previous interruptions associated with a historical record of previous interruptions;

calculate a duration of the interruption based on the periodicity of the previous interruptions;

compress the data at a second compression level that is higher than the first compression level; and     forward the data compressed at the second compression level to a transmitting component, for wireless spatially non-selective broadcast, for at least the duration of the interruption.

\* \* \* \* \*